(12) United States Patent
Bethard (10) Patent No.: US 6,496,544 B1
(45) Date of Patent: Dec. 17, 2002

(54) DIGITAL COMPUTING SYSTEM HAVING ADAPTIVE COMMUNICATION COMPONENTS

(75) Inventor: Roger A. Bethard, Chippewa Falls, WI (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/211,221

(22) Filed: Dec. 14, 1998

(51) Int. Cl.[7] .......................... H04L 25/03; G06F 13/12
(52) U.S. Cl. ........................................ 375/296; 710/65
(58) Field of Search ................................. 375/296, 295, 375/316, 346, 284; 371/22.31, 22.32; 714/30, 47, 48; 710/65, 13, 14

(56) References Cited

U.S. PATENT DOCUMENTS

| | | | | |
|---|---|---|---|---|
| 5,280,616 A | * | 1/1994 | Butler et al. | 709/108 |
| 5,805,609 A | * | 9/1998 | Mote, Jr. | 714/726 |
| 5,812,562 A | * | 9/1998 | Baeg | 714/726 |
| 6,003,142 A | * | 12/1999 | Mori | 714/30 |
| 6,189,140 B1 | * | 2/2001 | Madduri | 717/4 |
| 6,219,288 B1 | * | 4/2001 | Braceras et al. | 365/201 |
| 6,266,801 B1 | * | 7/2001 | Jin | 716/8 |

* cited by examiner

*Primary Examiner*—Chi Pham
*Assistant Examiner*—Khai Tran
(74) *Attorney, Agent, or Firm*—Schwegman, Lundberg, Woessner & Kluth, P.A.

(57) ABSTRACT

An adaptive computing system having trainable components for eliminating harmful effects of skew caused by the length of the transmission line or introduced by data-dependent sources. A transmitter provides a data value to the transmission line according to an output clock signal and precompensates the transmission line when a change in the data value is detected. A receiver is communicatively coupled to the transmitter by the transmission line and has a plurality of data latches. Each data latch stores a data value received from the transmission line according to a unique clock signal. All configuration and training of the adaptive transmitter and receiver is accomplished through a standard boundary scan register that complies with IEEE/ANSI standard 1149.1-1990.

41 Claims, 11 Drawing Sheets

DIGITAL COMPUTING SYSTEM HAVING ADAPTIVE COMMUNICATION COMPONENTS

FIELD OF THE INVENTION

This invention relates generally to the field of communication of digital information, and more particularly to a computing system having adaptive communication components for eliminating process-dependent and data-dependent communication errors.

BACKGROUND

Error-free communication between components of a computing system is critical for accurate computing. Communication error may be caused by many factors. First, transmittal rates between components in similar computing systems are greatly affected by variations in the fabrication process for the individual components. For this reason, computing systems are often designed assuming a worst-case transmittal rate even though the actual achievable rate may be much faster. Second, the effects of such process-dependent errors are often a function of the data being communicated. This is particularly true in systems having source-terminated transmission lines. These systems are often susceptible to jitter where the actual transmittal rate varies with transmitted data.

Error-free communication becomes even more difficult as the clock speeds for modem computing systems continually increase. Conventional communication designs often incorporate a data queue, such as a FIFO, to store and transmit data between components. This technique introduces severe latencies which are unacceptable for data communication within modem computing systems. As a result, many computing systems have implemented custom communications designs in an attempt to minimize communication latency. These custom designs, however, often need to be continually redesigned as clock speeds increase. Furthermore, various components of a computing system often communicate at different rates. For example, multiple processors on a single printed circuit board may communicate at over 300 MHZ while communications with memory or another component over a back panel is often at a lower rate such as 100 MHZ. Custom communication designs have difficulty handling the varying communication rates of a modem computing system and often need to be redesigned for each communication stream.

For the reasons stated above, and for other reasons stated below which will become apparent to those skilled in the art upon reading and understanding the present specification, there is a need in the art for a computing system which reduces process-dependent communication error and data-dependent communication error. There is also a need for a computing system that is adaptive and can easily be used in a variety of computing systems at a variety of communication rates.

SUMMARY OF THE INVENTION

The present invention is directed toward an adaptive computing system for reducing harmful skew caused by lengthy transmission lines. As illustrated in detail below, the system reduces data-dependent communication jitter and errors caused by process-dependent variations. In one embodiment, the invention is a data receiver including an input port having a plurality of data latches. Each data latch receives data from a transmission line and stores the data according to a unique clock signal. A data selector coupled to the input port selects one of the data latches and provides the stored data of the selected data latch to an output port. According to one feature, the data receiver comprises a test interface for commanding the data selector to select the data latch as a function of stored configuration information. According to another feature, the test interface stores the configuration information as a plurality of bits, each bit corresponding to one of the data latches and indicating whether the respective data latch stores accurate data. According to yet another feature, the test interface is a boundary scan register that accepts standard JTAG instructions for testing the receiver and user-defined instructions for programming the configuration information.

In another embodiment, the present invention is a data transmitter that includes an output latch for providing a data value to a transmission line. A precompensation control of the data transmitter provides a precompensation signal to the output latch when a change in the data value is detected. The output latch precompensates the transmission line according to the precompensation signal. According to one feature, the transmitter includes a test interface that is coupled to the precompensation control. The test interface enables and disables precompensation according to a configured precompensation mode. According to yet another feature, the test interface includes a boundary scan register that accepts standard JTAG instructions for testing the transmitter and user-defined instructions for configuring the precompensation mode.

In yet another embodiment, the present invention is a computing system having a transmitter coupled to a receiver by a transmission line. The transmitter provides a data value to the transmission line according to an output clock signal and precompensates the transmission line when a change in the data value is detected. The receiver has a plurality of data latches, each data latch storing a data value received from the transmission line according to a unique clock signal.

In another embodiment, the present invention is a method for communicating data in a computing system having a transmitter communicatively coupled to a receiver by a transmission line. The method includes the steps of transmitting data to the receiver via the transmission line and storing data received from the transmission line in a plurality of data latches according to a plurality of clock signals. According to one feature, the method includes the step of precompensating the transmission line when a change in the data value is detected. According to another feature, the method includes the step of selecting one of the data latches as a function of configuration information maintained in the receiver.

These and other features and advantages of the invention will become apparent from the following description of the preferred embodiments of the invention.

DETAILED DESCRIPTION

In the following detailed description, references are made to the accompanying drawings that illustrate specific embodiments in which the invention may be practiced. Electrical, mechanical, programmable and structural changes may be made to the embodiments without departing from the spirit and scope of the present invention. The following detailed description is, therefore, not to be taken in a limiting sense and the scope of the present invention is defined by the appended claims and their equivalents.

Figure 1:
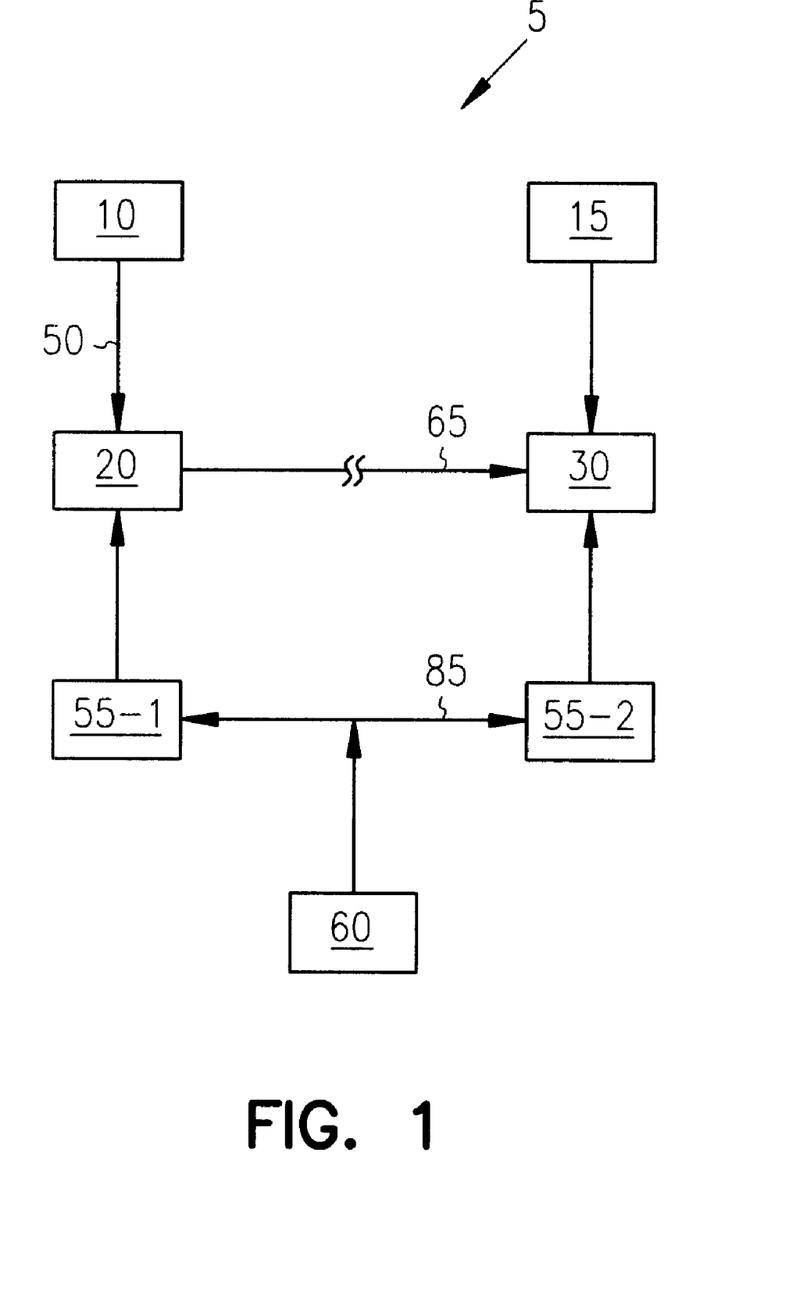
FIG. 1, is a block diagram illustrating a computing system having an adaptive transmitter and receiver.

FIG. 1, is a block diagram illustrating computing system 5 in which component 10 communicates digital information to component 15 via transmitter 20 and receiver 30. Transmitter 20 is capable of communicating input data 50 to receiver 30 via communications link 65 at a variety of communication rates. In one embodiment component 10, component 15, transmitter 20 and receiver 30 are located on a single printed circuit board and communicate at high data rates. For example, component 10 and component 15 may be parallel processors communicating via transmitter 20 and receiver 30 at data rates exceeding 300 MHZ. As another example, component 10 and component 15 may by ASICs that incorporate transmitter 20 and receiver 30, respectively. In these embodiments communications link 65 is typically a single trace or a data bus formed on the printed circuit board. In another embodiment, component 10 and component 15 are separately located and communicate at a lower rate of speed such as 100 MHZ. For example, component 10 may be a processor while component 15 may be a memory module. In this embodiment, component 10 and component 15 often communicate over a communications backplane. For these reasons, as illustrated in detail below, transmitter 20 and receiver 30 may be operated at a variety of rates without requiring redesign.

Reference clock 60 provides a base clock frequency 85, such as 25 MHZ, for synchronizing each controller 55. Controllers 55 are responsible for training transmitter 20 and receiver 30 in order to compensate for process-dependent and data-dependent communication errors, thereby ensuring accurate communication. In addition, transmitter 20 and receiver 30 may be trained to compensate for a wide range of communication delays caused by communications link 65 and are therefore useable in a variety of applications without requiring redesign.

In order to train transmitter 20 and receiver 30, controller $55_1$ loads test data into transmitter 20 while controller $55_2$ informs receiver 30 of the expected data. Once transmitter 20 and receiver 30 have been loaded with the test data, controllers 55 configure the clock rates of transmitter 20 and receiver 30. The present invention sets the transmitter 20 and receiver 30 at different clock frequencies in order to allow fine compensation at less than one-half of a clock cycle. Because data-dependent communication error is often a function of the fabrication process and the length of transmission line 65, the receive frequency is set as a function of both the transmission frequency and the system reference. In one embodiment, receiver 30 is initially configured to operate at a lower frequency than 20 transmitter. Receiver 30 is configured such that a corresponding receive clock has one less clock cycle than a transmit clock for each cycle of base clock 85. For example, in a system having in which base clock frequency 85 operates at 25 MHZ, controller 55, configures transmitter 20 at a transmission frequency of 300 MHZ while controller 552 configures receiver 30 to operate at a slightly lower receive frequency such as 275 MHZ. In this configuration, for each cycle of base clock 85, the transmit clock has 12 complete clock cycles while the receive clock has complete 11 clock cycles.

Figure 2:
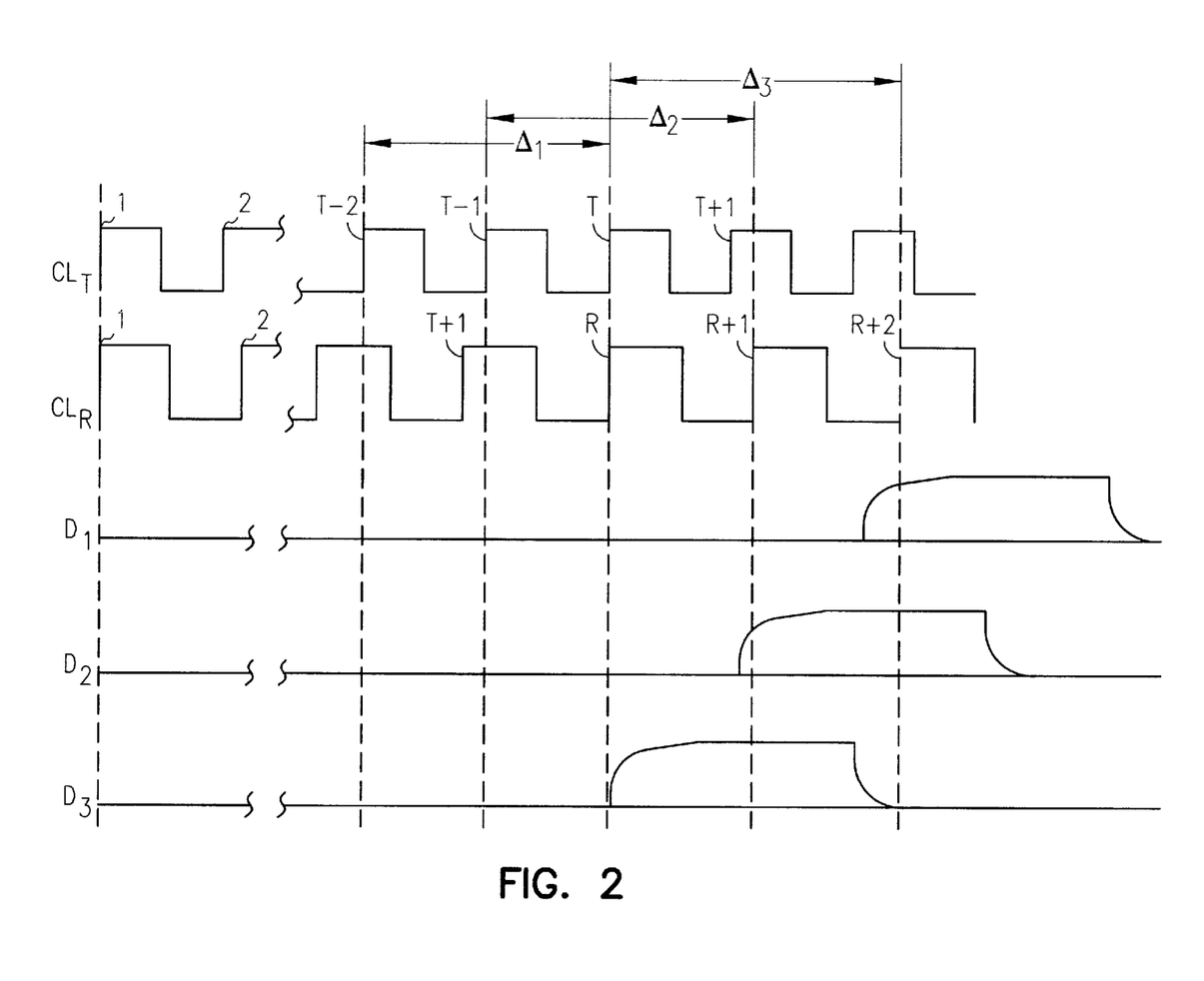
FIG. 2, is a timing diagram for the computing system during the adaptive training of the transmitter and the receiver.

FIG. 2 is a timing diagram for computing system 5 during training of transmitter 20 and receiver 30. As illustrated in FIG. 2, the receive clock ($CL_R$) is configured to operate at a slightly slower frequency than the transmit clock ($CL_T$). Furthermore, the rising edges of $CL_T$ and $CL_R$ are aligned every R receive clock cycles and T transmit clock cycles. FIG. 2 illustrates transmitter 20 operating at 300 MHZ and receiver 30 operating at 275 MHZ such that the rising edges of $CL_T$ and $CL_R$ are aligned every 11 (R) receive clock cycles and 12 (T) transmit clock cycles, i.e., T=R+1.

After configuring the clock frequencies, controller $55_1$ commands transmitter 20 to repeatedly transmit the loaded test data in order to determine the electrical length of communications link 65. First, controller $55_1$ commands transmitter 20 to transmit the test data such that on clock edge T the data is held constant on communications link 65 for a configured number of clock cycles (H). For example, in one embodiment transmitter 20 holds the data constant for 2 transmit clock cycles, i.e., until rising clock edge T+2. Simultaneously, $55_2$ commands receiver 30 to latch data from communications link 65 on clock edge R+H. For example, if H equals 2, receiver 30 latched the data on clock edge R+2. In this manner, receiver 30 is configured to latch the transmitted data assuming a worst-case delay for communications link 65. Because the receive frequency is less than the transmit frequency, this delay corresponds to more than H transmit clock cycles as indicated by $\Delta_3$.

Data signal $D_1$ of FIG. 2 illustrates the data pattern of communications line 65 as received by receiver 30, thus $D_1$ is shifted in time from rising edge T of the transmit clock due to the electrical line length of communications line 65. Upon latching $D_1$ at edge R+2, receiver 30 compares the stored data with the loaded test data. If the loaded test data and the stored data match, the process is repeated such that controller $55_1$ commands transmitter 20 to hold the data pattern constant one transmit clock edge earlier, i.e., T−1. Similarly, $55_2$ commands receiver 30 to latch the data one receive clock cycle earlier, i.e., R+1. Because of the difference in clock frequencies, the delay between transmitting and receiving is reduced from $\Delta_3$ to $\Delta_2$, thereby shortening the effective line length of communications line 65.

Upon latching data signal $D_2$ at edge R+1, receiver 30 again compares the stored data with the loaded test data. If the test data and the stored data match, the process is repeated a third time in which transmitter 20 holds the data constant at clock edge T−2 and receiver 30 latches data signal $D_3$ at clock edge R. As such, the delay between transmitting and receiving is further reduced from $\Delta_2$ to $\Delta_1$, thereby shortening the effective line length of communications line 65.

This training process continues until receiver 30 detects a mismatch between the received data and the expected data. For example, as illustrated in FIG. 2, data signal $D_1$ is invalid at clock edge R. Once a mismatch is detected and the training process terminates, controller $55_2$ configures receiver 30 to latch transmissions during normal operations such that proper communication is ensured. As described in detail below, receiver 30 includes a plurality of latches for capturing data at a variety of times. In normal operation, receiver 30 selects data from the latch corresponding to the shortest delay that yielded accurate data as determined by the adaptive training procedure described above. In this manner, receiver 30 ensures that accurate data is received, yet minimizes the required compensation for transmission delays caused by the length of transmission line 65 (FIG. 1).

This techniques allows computing system 5 to be easily configured to compensate for a wide range of communication delays and are therefore useable in a variety of applications without requiring redesign. Furthermore, this training technique is easily applied to computing systems having multiple transmitter-receiver pairs simply by repeating the training for each pair.

Figure 3:
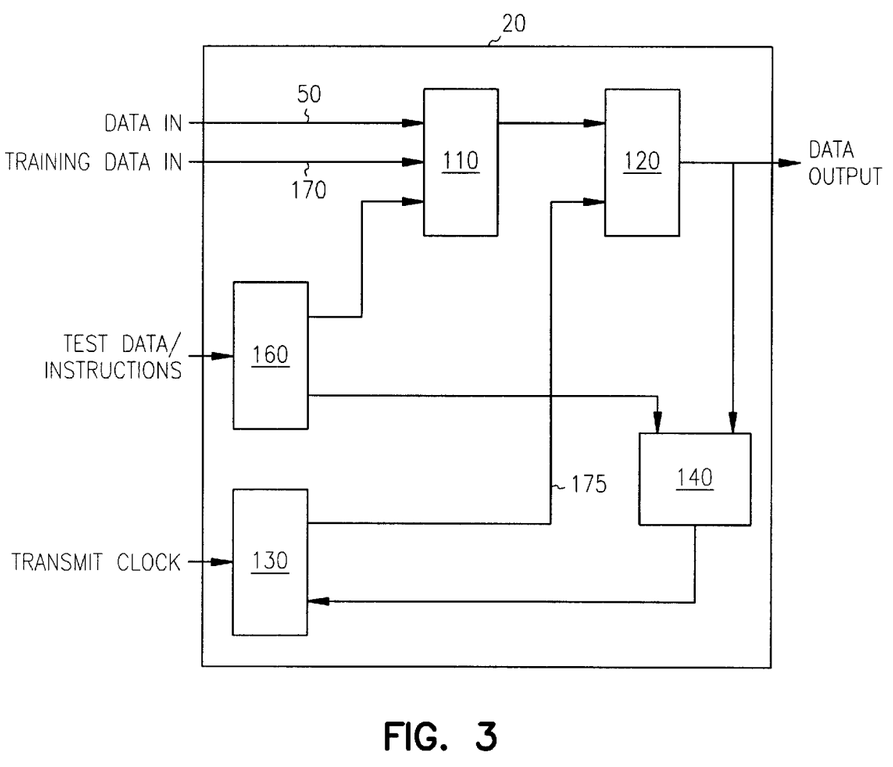
FIG. 3 is a block diagram detailing one embodiment of an adaptive transmitter.

FIG. 3 is a block diagram detailing one embodiment of transmitter 20 of FIG. 1. Transmitter 20 includes data selector 110, output latch 120, clock generator 130, precompensation control 140, and test interface 160. One advantage of the present invention is that all configuration and training of transmitter 20 is accomplished through test interface 160 which, in one embodiment, supports all standard JTAG instructions normally associated with a controllable Boundary Scan Register including SAMPLE/PRELOAD, EXTEST, INTEST and RUNBIST. Thus, test interface 160 complies with IEEE/ANSI standard 1149.1-1990 which defines a standard electrical architecture for testing complex device packages.

In boundary scan testing, test elements are typically built into the IC's populated on the circuit board. The elements, known as boundary scan cells (BSC's), correspond to each IC input and output pin so that signals at the IC's boundaries can be controlled and observed. Conventional implementations of a BSC incorporate the capability to sample, preload and set the BSC. The BSC's for each pin of a host IC are interconnected to form a shift-register chain or boundary scan register. The boundary scan register provides a serial path around the core logic to provide test data and control signals to each boundary scan cell. Test data can be shifted, therefore, through the boundary scan register to access circuit locations which cannot be physically accessed with traditional probe technology. In this fashion, boundary scan testing offers access to the input and output pins of the IC's on the printed circuit board by means of a test bus connecting the test elements.

In addition to standard JTAG instructions, test interface 160 supports user-defined instructions such that transmitter 20 may be configured to operate in one of three modes. In NORMAL mode, test interface 160 is inactive and transmitter 20 communicates data to receiver 30 as described above. When a standard JTAG instruction is received, such as INTEST, RUNBIST or EXTEST, transmitter operates in TEST mode and test interface 160 operates as conventional BSR test circuitry. In this mode, test interface 160 receives test data and serially shifts the test data out output latch 120 via data selector 110. When a user-defined instruction is received, transmitter 20 operates in TRAIN mode and executes the adaptive training process described above. In this mode, transmitter 20 receives training data 170 from controller $55_1$.

Precompensation control 140 is responsible for eliminating data-dependent errors in the output data communicated by output latch 120. Precompensation control 140 monitors the output data produced by output latch 120 and instructs clock generator 130 to generate output clock 175 as a function of previous output data. More specifically, precompensation control 140 detects when the current output data is opposite in state from the immediately prior output data and signals clock generator 130 to appropriately retard output clock 175 in order to eliminate any communication error introduced by the state change. Thus, clock generator 130 produces output clock 175 as a function of a precompensation signal generated by precompensation control 140.

In one embodiment, precompensation control 140 is configurable via test interface 160 to operate in one of a plurality of modes, each mode corresponds to a unique precompensation period. For example, in one embodiment precompensation control 140 supports three modes of precompensation including PC_OFF, PC_1, and PC_2. Operating in PC_OFF mode, precompensation control 140 instructs clock generator 130 to produce output clock 175 from the input clock signal without modification, i.e. no precompensation. This mode of operation is suitable for very short communication lengths, perhaps between ASICs on a single printed circuit board. During the PC_1 mode, however, precompensation control 140 instructs clock generator 130 to retard output clock 175 for one clock cycle. Therefore, in this mode one cycle of output clock 175 will last greater than 1.0 input clock cycles. During the PC_2 mode, precompensation control 140 instructs clock generator 130 to retard output clock 175 for two clock cycles. Modes PC_1 and PC_2 are suitable for long transmission lengths, perhaps between components located on separate boards. In this manner, precompensation control 140 is configurable to eliminate data-dependent communication error while maintaining high communication rates in a variety of systems. Preferably, precompensation control 140 is configured before training of computing system 5.

Data selector 110 functions as a three-to-one multiplexer. When transmitter 20 is operating in NORMAL mode, data present on Data In 50 is selected by data selector 110 and propagated to output latch 120. During TRAIN mode, port selector 110 receives training data 170 from controller 55, and provides the training data to output latch 120. During TEST mode data selector 110 output standard JTAG test data received from test interface 160.

Figure 4A:
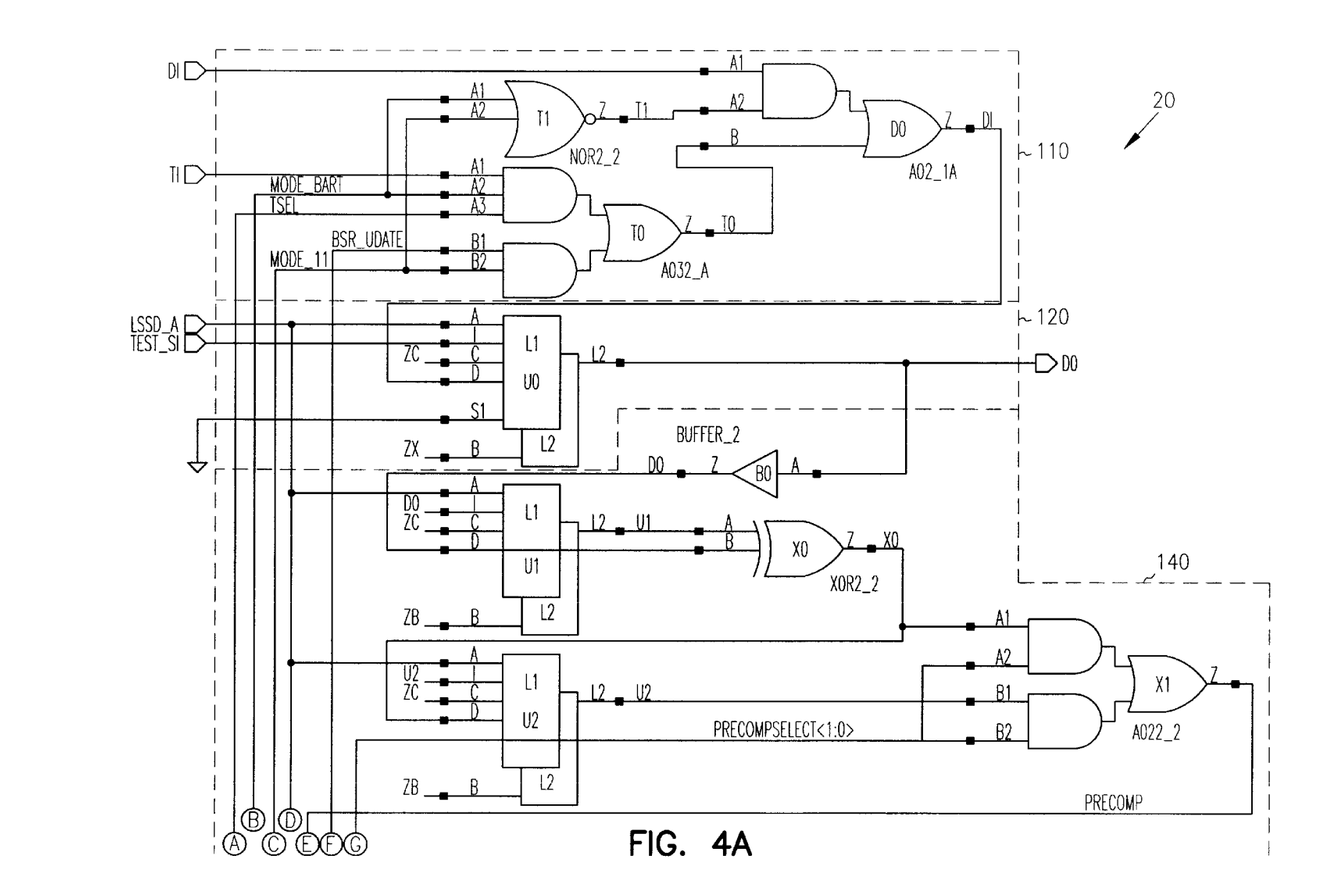
FIG. 4 is a schematic diagram detailing one embodiment of the adaptive transmitter of FIG. 3.
Figure 4B:
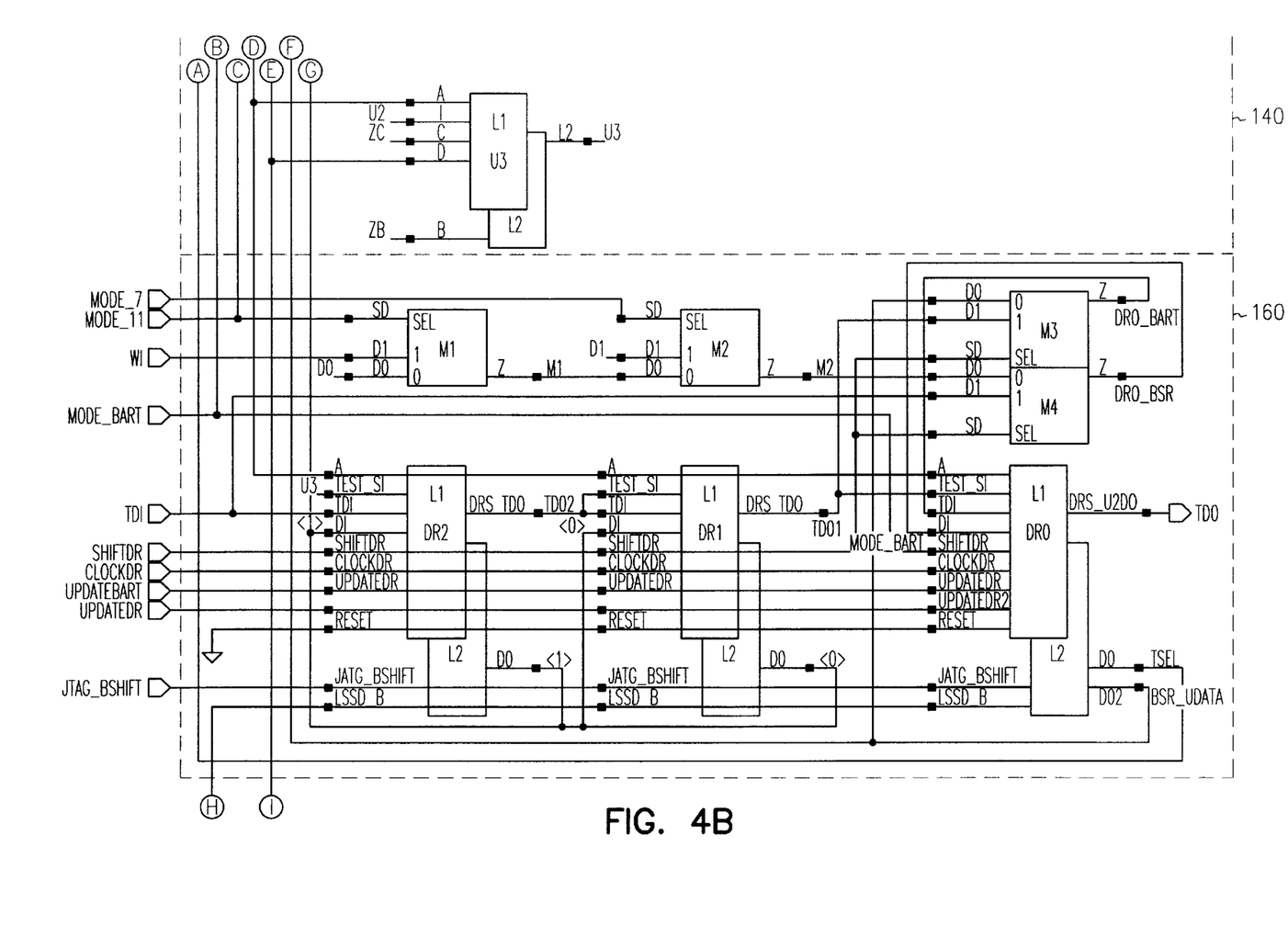
Figure 4C:
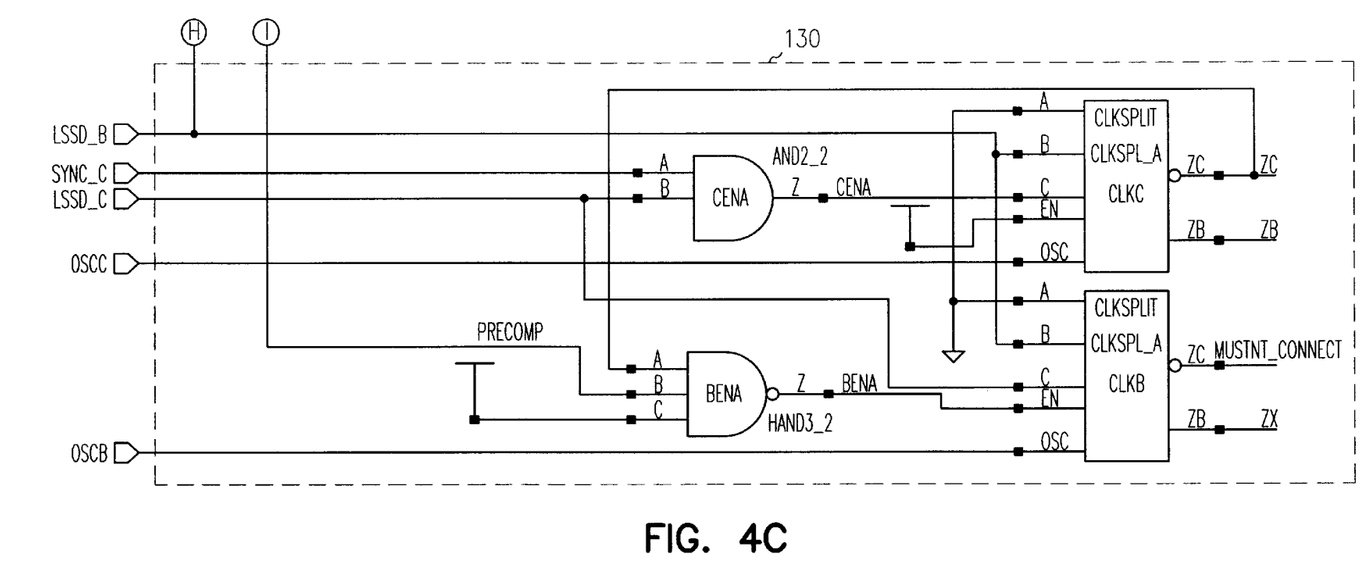

FIG. 4 is a schematic detailing one embodiment of transmitter 20. Gates T0, T1, and D0 form data selector 110 and function as a three-to-one multiplexer. Latches U1, U2, and U3 and gates X0 and X1 form precompensation control 140. Latches U2 and U3 are history latches that store previously transmitted data. Gate X0 is an edge detector which is active when output latch 120 changes state. More specifically, gate X0 compares the current state of latch U0 with its previous state stored in latch U1. Gate X1 outputs the precompensation signal of precompensation control 140 when gate X0 is active and precompensation is enabled via Test interface 160.

Clock generator 130 includes gates BENA, CENA and clock drivers CLKB and CLKC. Gate CENA and clock-driver CLKC are used to generate a clock for the L1 portions of latches U0, U1, U2 and U3. This clock is typically operating at a high clock frequency such as 300 MHZ. Gate BENA and latch CLKB are used to generate a clock for the L2 potion of latch U0 which may be used for communicating at other clock rates such as 100 MHZ. When precompensation control 140 provides precompensation signal to gate BENA, CLKB is enabled and output ZX drives the L2 portion of latch U0, thereby causing output latch 120 to produce the output data. In this manner, precompensation control 140 does not affect the L1 portion of U0.

Figure 5:
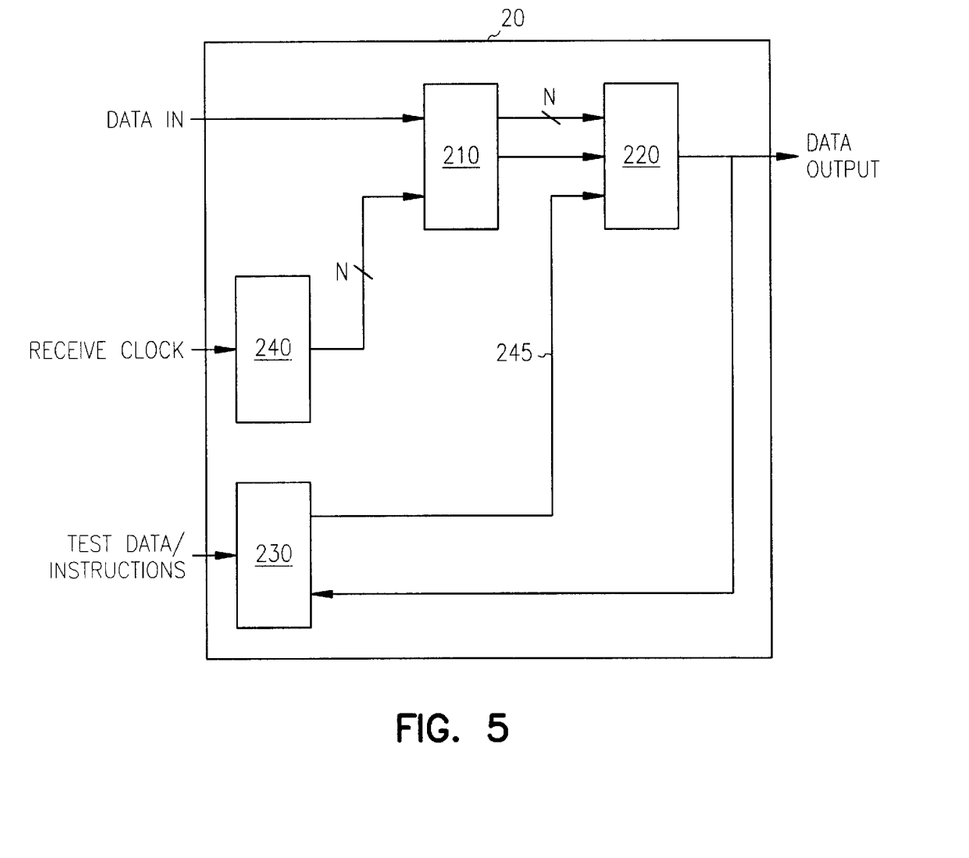
FIG. 5 is a block diagram detailing one embodiment of an adaptive receiver.
Figure 6A:
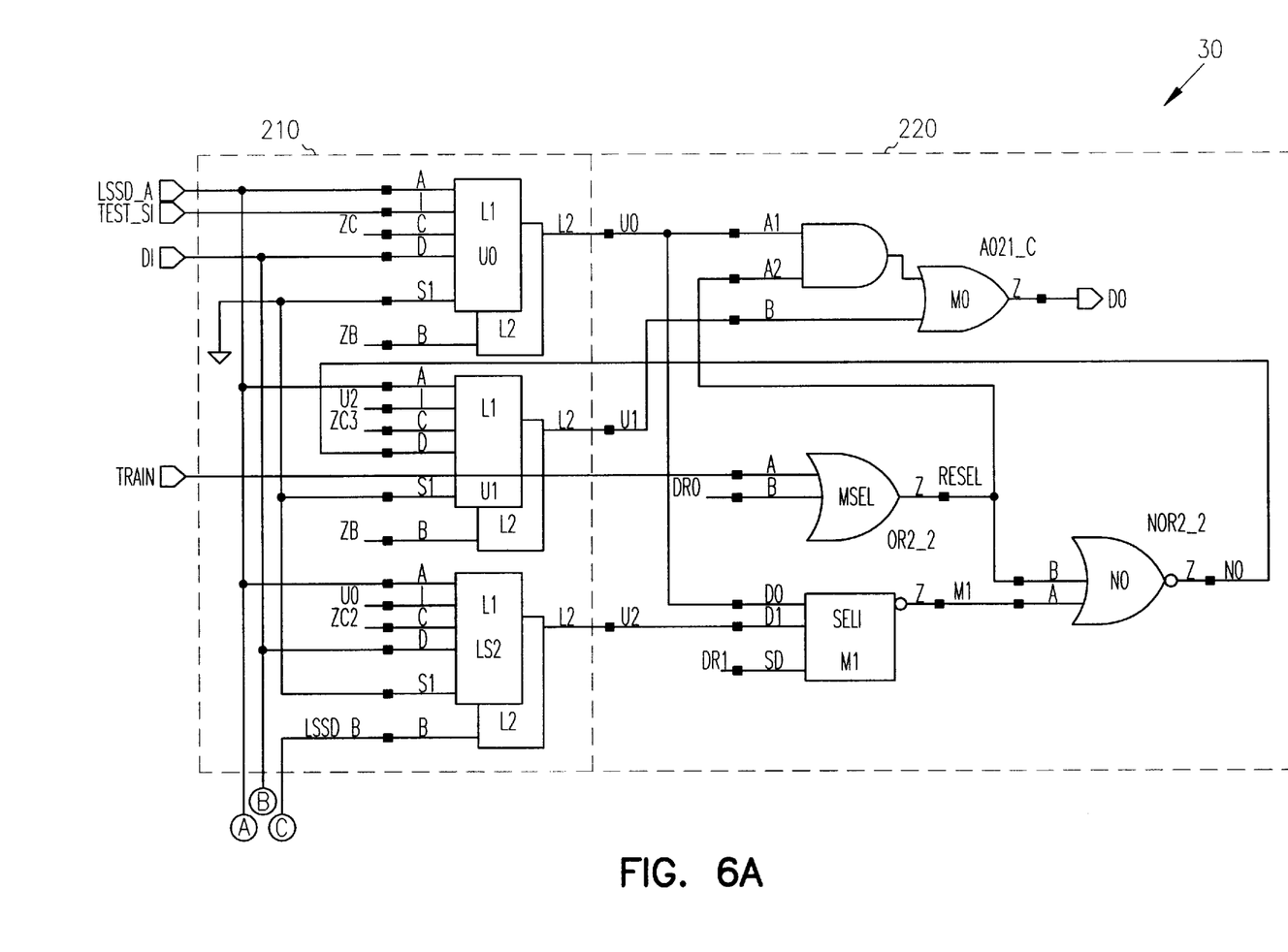
FIG. 6 is a schematic diagram detailing one embodiment of the adaptive receiver of FIG. 5.
Figure 6B:
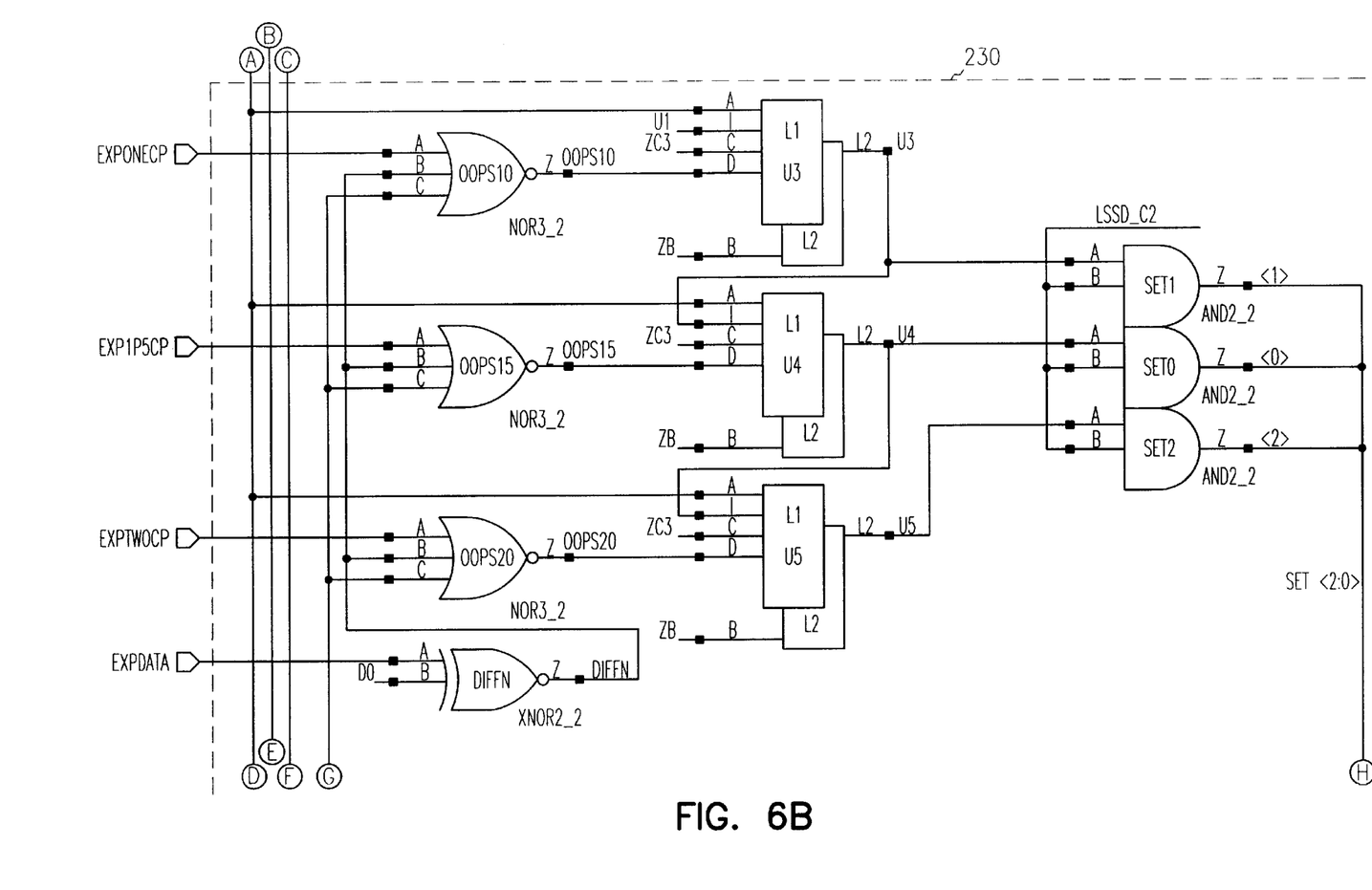
Figure 6C:
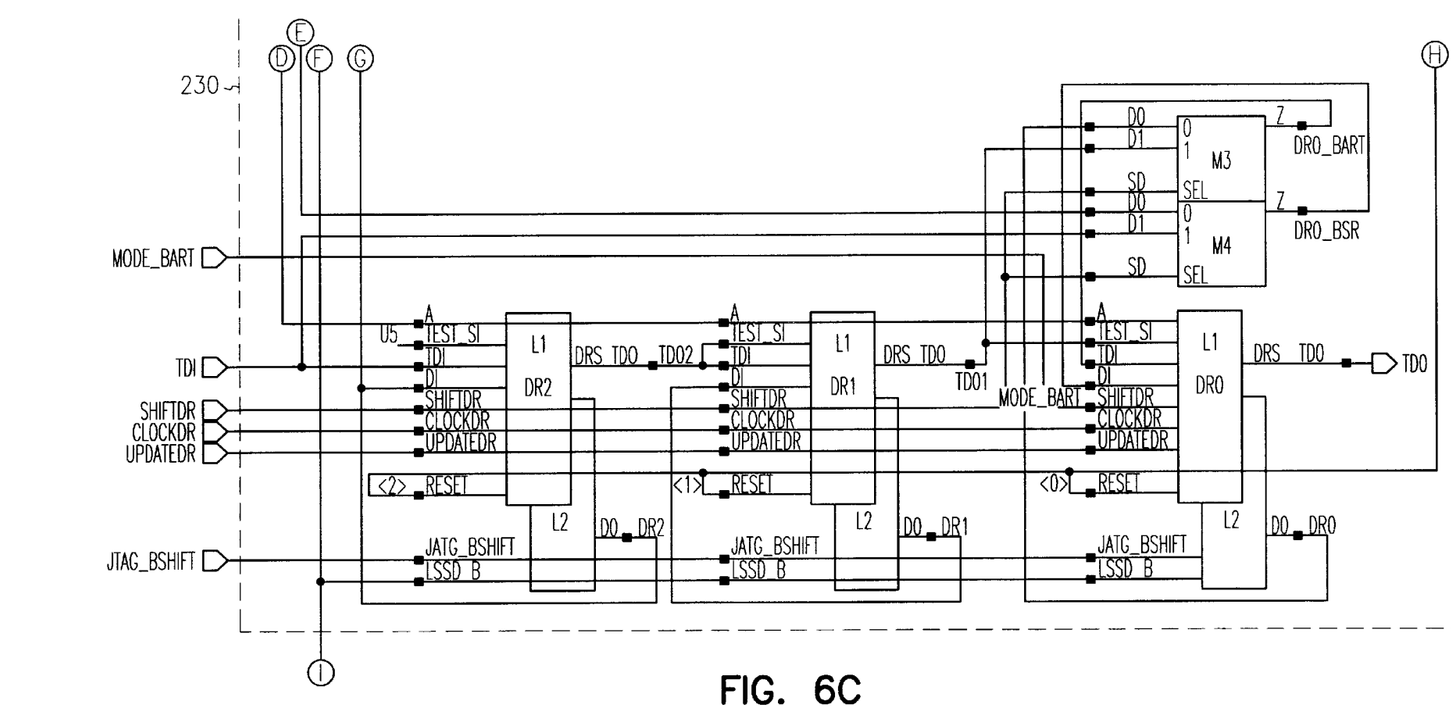
Figure 6D:
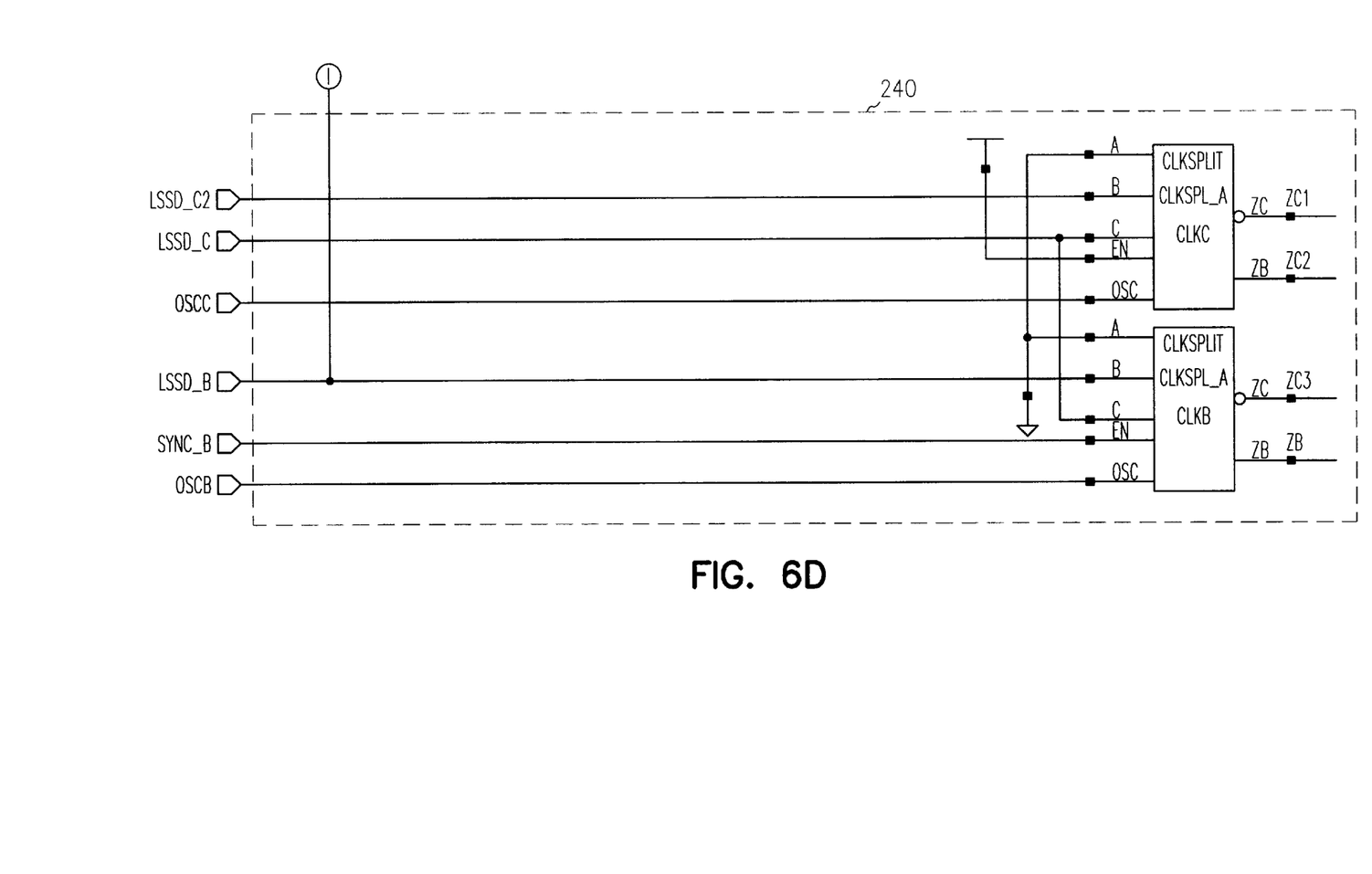

FIG. 5 is a block diagram detailing one embodiment of receiver 30 of FIG. 1. Receiver 30 includes input port 210, data select 220, test interface 230 and clock splitter 240. As discussed in detail below, input port 210 includes a plurality of latches for capturing data from Data In at a variety of times. In this manner, receiver 30 compensates for delays caused by the transmission line and is adaptable for a wide variety of applications.

Clock splitter 240 drives input port 210 with N clocks based on the receive clock and sync pulses that are generated by controller 55₂ (FIG. 1). Input port 210 latches input data N times according to the N clocks provided by clock splitter 240. For example, in one embodiment, clock splitter 240 provides 2 clocks to input port 210 such that input port 210 latches input data after one clock cycle of the receive clock and after 1.5 clock cycles. In addition, input port 210 may delay the input data for additional clock cycles.

The multiple data values stored by input port 210 are provided to data selector 220. In normal operation, test interface 230 drives select lines 245 to control data selector 220 so as to couple one latched data from input port 210 to the Data Output port, thereby providing the selected data value to component 15 (FIG. 1). According to the present invention, test interface 230 drives select lines 245 based on the adaptive training procedure described above. In this manner, receiver 30 ensures that an accurate data value is presented to the Data Output port, yet minimizes the required compensation for transmission delays caused by the length of transmission line 65 (FIG. 1).

Configuration and training of receiver 30 is accomplished through test interface 230 which, in one embodiment, supports standard JTAG instructions and user-defined instructions. During training, controller 55₂ supplies the expected data to test interface 230 of receiver 30. Controller 55₂ then instructs test interface 230 to compare the expected data with the latched data of input port 210. As described in detail above, test interface 230 drives select lines 245 according to these results. In this fashion, test interface 230 is programmed to minimize the compensation for line delay yet insure accurate communication.

FIG. 6 is a schematic detailing one embodiment of receiver 30. Input port 210 is formed by latches U0, L2S and U1 that store input data from D1 after 1, 1.5 and 2 receive clock cycles, respectively. Thus, these latches correspond to transmission lengths of 1, 1.5 and 2 receive clock periods. These stored values are presented to data selector 220 which includes gates M0, N0, MSEL and M1.

Latches DR2, DR1 and DR0 of test interface 230 form a Boundary Scan Register. These latches are loaded by shifting data in from TDI and are controlled by signals SHIFTDR, CLOCKDR, UPDATEDR and JTAG_BSHIFT. Test interface 230 compares the expected data present on ExpData with the output of data selector 220 using DIFFN which is an XNOR gate. The output of the comparison is fed to NOR gates OOPS10, OOPS15 and OOPS20 which are selected by controller 55₂ (FIG. 1). Latches U3, U4 and U5 capture the results of the comparisons during training and set latches DR2, DR1 and DR0. When one of the comparison fails and either DR2, DR1 or DR0 is set, the training terminates. During normal operations, the outputs of DR2, DR1 or DR0 form select lines 245 (FIG. 5) in order to select an accurate data value from one of the plurality of data latches of input port 210.

Clock splitter 240 is formed by clock drivers CLKB and CLKC and provides clocks ZC1 and ZC2 to input port 210 such that input port 210 captures input data after one clock cycle of the receive clock and after 1.5 clock cycles, respectively. Clock ZC3 is used by input port 210 to delay the latched data for one full clock cycle. Clock driver CLKC is used to generate a clock for the L1 portions of latches U0 and U2. This clock is typically operating at a high clock rate such as 300 MHZ but may be used for other clock rates such as 100 MHZ. Clock driver CLKB is used to generate a clock for the L2 potion of latch U0 and U2. This clock is typically operating at a high clock rate such as 300 MHZ. This allows receiver 30 to function at more than one frequency domain, such as 300 MHZ and 100 MHZ.

Various embodiments of an adaptive computing system having trainable components have been described. In one embodiment, the present invention dynamically precompensates the transmission line in order to cancel data skew introduced by data-dependent sources. In another embodiment, the receiver is programmed to eliminate harmful effects of data skew caused by lengthy transmission lines.

Several advantages of the present invention have been illustrated. In one embodiment, the present computing system may be located on a single printed circuit board for facilitating error-free communication at high data rates. In another embodiment, the components may be located on separate boards and the present invention adapts to communication at lower speeds. Another advantage of the present invention is that in one embodiment all configuration and training of the adaptive transmitter and receiver is accomplished through a standard boundary scan register that complies with IEEE/ANSI standard 1149.1-1990. This application is intended to cover any adaptations or variations of the present invention. It is manifestly intended that this invention be limited only by the claims and equivalents thereof.

I claim:

1. A data receiver comprising:
    an input port having a plurality of data latches, including a first data latch clocked with a receive clock and a second data latch clocked with a delayed version of the receive clock, wherein each data latch stores data received from a transmission line according to a unique clock signal;
    comparing means for comparing data stored in the first and second data latches to an expected data value; and
    a data selector for selectively coupling one of the plurality of data latches to an output port as a function of the comparison of the data stored in the first and second data latches to the expected data value.

2. The data receiver of claim 1, wherein the comparing means includes a test interface, the test interface commanding the data selector to select the data latch as a function of stored configuration information.

3. The data receiver of claim 2, wherein the test interface sets the configuration information by comparing the stored data of each of the data latches with an expected data value.

4. The data receiver of claim 2, wherein the test interface stores the configuration information as a plurality of bits, each bit corresponding to one of the data latches and indicating whether the respective data latch stores accurate data.

5. The data receiver of claim 2, wherein the test interface includes a boundary scan register.

6. The data receiver of claim 5, wherein the boundary scan register accepts standard JTAG instructions for testing the receiver and user-defined instructions for programming the configuration information.

7. The data receiver of claim 5, wherein during a normal mode the boundary scan register maintains the configuration information.

8. The data receiver of claim 1, wherein the receiver further includes a clock generator providing the unique clock signals to the input port as a function of the receive clock.

9. The data receiver of claim 8, wherein the delayed version of the receive clock is delayed from the receive clock by one half of a receive clock cycle.

10. A data transmitter comprising:
an output latch for providing a data value to a transmission line;
a test interface; and
a precompensation control connected to the test interface and the output latch, the precompensation control providing a precompensation signal to the output latch when a change in the data value is detected, wherein the output latch precompensates the transmission line according to the precompensation signal;
wherein the test interface loads test transmit data for transmission to a receiver and enables and disables precompensation according to a configured precompensation mode.

11. The data transmitter of claim 10, wherein the test interface includes a boundary scan register.

12. The data transmitter of claim 11, wherein the boundary scan register accepts standard JTAG instructions for testing the transmitter and user-defined instructions for configuring the precompensation mode.

13. A computing system comprising:
a transmitter for providing a data value to a transmission line according to an output clock signal, wherein the transmitter precompensates the transmission line when a change in the data value is detected; and
a receiver communicatively coupled to the transmitter by the transmission line, wherein the receiver includes:
a plurality of data latches, including a first data latch clocked with a receive clock and a second data latch clocked with a delayed version of the receive clock, each data latch storing a data value received from the transmission line according to a unique clock signal;
comparing means for comparing the data values stored in the first and second data latches to the data value transmitted by the transmitter; and
configuring means for configuring the receiver as a function of the comparison of the data values stored in the first and second data latches to the data value transmitted by the transmitter.

14. The computing system of claim 13, wherein the receiver maintains configuration information and selects one of the data latches as a function of the configuration information.

15. The computing system of claim 14, wherein the configuring means includes a test interface for setting the configuration information.

16. The computing system of claim 15, wherein the receiver includes a boundary scan register.

17. The computing system of claim 16, wherein the boundary scan register of the receiver accepts standard JTAG instructions for testing the receiver and user-defined instructions for programming the configuration information of the receiver.

18. The computing system of claim 13, wherein the transmitter adjusts a duration of precompensation according to a configured precompensation mode.

19. The computing system of claim 18, wherein the transmitter includes boundary scan register.

20. The computing system of claim 19, wherein the boundary scan register of the transmitter accepts standard JTAG instructions for testing the transmitter and user-defined instructions for configuring the mode of precompensation.

21. A method for communicating data in a computing system having a transmitter communicatively coupled to a receiver by a transmission line, wherein the receiver includes a plurality of data latches, including a first data latch clocked with a receive clock and a second data latch clocked with a delayed version of the receive clock, the method comprising:
loading the transmitter with transmit test data;
transmitting the transmit test data at a transmit clock frequency from the transmitter-to the receiver via tile transmission line;
storing the transmit test data received from the transmission line in the first and second data latches as a function of the receive clock;
comparing the transmit test data stored in the first and second data latches to the transmit test data loaded in the transmitter; and
configuring the receiver based on the comparison of the transmit test data stored in the first and second data latches to the transmit test data loaded in the transmitter.

22. The method of claim 21, wherein transmitting the data includes precompensating the transmission line when a change in data value is detected.

23. The method of claim 22, wherein precompensating includes providing a precompensation circuit having a plurality of precompensation modes and adjusting a duration of the precompensation according to the precompensation mode.

24. The method of claim 23, wherein adjusting includes programming a boundary scan register of the transmitter to set the mode of precompensation.

25. The method of claim 21, wherein storing includes selecting one of the data latches as a function of configuration information maintained in the receiver.

26. The method of claim 25, wherein selecting includes programming the configuration information of the receiver.

27. The method of claim 26, wherein configuring the receiver includes storing configuration information based on a comparison of the transmit test data stored in the first and second data latches to the transmit test data loaded in the transmitter.

28. The method of claim 27, wherein loading the transmitter includes writing an instruction to a boundary scan register within the transmitter, and wherein the method further comprises loading the receiver with transmit test data to compare to transmit test data stored in the first and second data latches via an instruction to a boundary scan register within the receiver.

29. The method of claim 26, wherein programming further includes setting a receive clock rate of the receiver and a transmit clock rate of the transmitter, wherein the receive clock rate is not equal to the transmit clock rate.

30. A method for configuring a computing system having a transmitter communicatively coupled to a receiver by a transmission line comprising:
setting the receiver to operate at a receive frequency that is not equal to the transmit frequency of the transmitter;
loading the receiver and the transmitter with test data;
commanding the transmitter to transmit the test data to the receiver via the transmission line;
commanding the receiver to store data received from the transmission line; and
configuring the receiver as a function of a comparison between the stored data received from the transmission line and the loaded test data.

31. The method of claim 30, wherein configuring includes repeating the commanding steps until the stored data does not equal the loaded test data.

32. The method of claim 31, wherein the transmitter transmits the test data C transmit clock cycles after a transition of a system clock and the receiver stores the test data D receive clock cycles after the transition of the system clock, and further wherein repeating includes decreasing C and D.

33. The method of claim 30, wherein the transmitter transmits the test data after T transitions of a transmit clock, and further wherein the receiver stores the test data from the transmission line after H+R transitions of a receive clock, wherein the transition R of the receive clock is substantially aligned with the transition T of the transmit clock.

34. The method of claim 33, wherein T=R+1.

35. The method of claim 33, wherein H=2.

36. The method of claim 30, wherein during normal operation the receiver stores the received data in a plurality of data latches according to a plurality of clock signals, and further wherein configuring includes selecting one of the data latches as a function the comparison.

37. The method of claim 36, wherein selecting includes the step of programming configuration information into the receiver.

38. The method of claim 36, wherein programming includes writing an instruction to a boundary scan register within the receiver.

39. A data transmitter for transmitting data to a receiver operating at a receive clock frequency, the data transmitter comprising:

a an output latch for transmitting a data value to a receiver;

a test interface connected to thee output latch; and a clock circuit connected to the output latch and the test interface;

wherein the test interface operates under system control to load test data in the output latch for transmission to a receiver and to selectively transmit the test data to the receiver at a clock frequency other than a clock frequency used to capture the test data at the receiver.

40. The data transmitter of claim 39, wherein the test interface includes a boundary scan register.

41. The data transmitter of claim 40, wherein the boundary scan register accepts standard JTAG instructions for testing the transmitter and user-defined instructions for configuring a precompensation mode.

* * * * *

UNITED STATES PATENT AND TRADEMARK OFFICE
CERTIFICATE OF CORRECTION

PATENT NO.   : 6,496,544 B1
DATED        : December 17, 2002
INVENTOR(S)  : Roger A. Bethard It is certified that error appears in the above-identified patent and that said Letters Patent is hereby corrected as shown below:

<u>Title page,</u>
Item [73], Assignee, insert -- Research, -- after "Cray".
Delete "Seattle, WA" and insert -- Eagan, MN -- therefor.

<u>Column 1,</u>
Lines 30, 35 and 46, delete "modem" and insert -- modern -- therefor.

<u>Column 3,</u>
Line 66, delete "55," and insert -- 55$_1$ -- therefor.

<u>Column 4,</u>
Line 1, delete "552" and insert -- 55$_2$ -- therefor.

<u>Column 5,</u>
Line 5, delete "techniques" and insert -- technique -- therefor.

<u>Column 6,</u>
Line 33, delete "55," and insert -- 55$_1$ -- therefor.
Line 56, delete "potion" and insert -- portion -- therefor.

<u>Column 7,</u>
Line 6, delete "552" and insert -- 55$_2$ -- therefor.

<u>Column 8,</u>
Line 3, delete "potion" and insert -- portion -- therefor.

UNITED STATES PATENT AND TRADEMARK OFFICE
CERTIFICATE OF CORRECTION

PATENT NO.   : 6,496,544 B1
DATED        : December 17, 2002
INVENTOR(S)  : Roger A. Bethard It is certified that error appears in the above-identified patent and that said Letters Patent is hereby corrected as shown below:

Column 12,
Line 7, in claim 39, delete "a" before "an".
Line 10, in claim 39, delete "thee" and insert -- the -- therefor.

Signed and Sealed this

Eighth Day of July, 2003

JAMES E. ROGAN
*Director of the United States Patent and Trademark Office*